United States Patent [19]

Dembek et al.

[11] Patent Number: 5,233,004
[45] Date of Patent: Aug. 3, 1993

[54] CHROMIUM CARBONYL COMPLEXES OF POLYAMIDE

[75] Inventors: Alexa A. Dembek; Andrew E. Feiring, both of Wilmington

[73] Assignee: E. I. Du Pont de Nemours and Company, Wilmington, Del.

[21] Appl. No.: 886,416

[22] Filed: May 20, 1992

[51] Int. Cl.$^5$ .................... C08G 69/32; C08G 83/00
[52] U.S. Cl. ........................................ 528/9; 528/183; 528/337; 528/340; 528/344; 528/348; 528/395
[58] Field of Search ................... 528/9, 337, 340, 348, 528/183, 344, 395

[56] References Cited

PUBLICATIONS

J. Jin and R. Kim, *Polym. J.*, vol. 19, pp. 977–980 (1987).

*Primary Examiner*—Harold D. Anderson
*Attorney, Agent, or Firm*—Barbara C. Siegell

[57] ABSTRACT

Disclosed herein are chromium carbonyl complexes of polyamides containing units derived from aromatic diamines in which about 10 to about 90% of those units are complexed with a chromium carbonyl compound, and a process for making them. When aramids are used, the solubility of the polymer in organic solvents is enhanced, and in the case of certain aramids lyotropic solutions are formed. These solutions can be used to make anisotropic films and fibers.

14 Claims, No Drawings

CHROMIUM CARBONYL COMPLEXES OF POLYAMIDE

BACKGROUND OF THE INVENTION

Disclosed herein are chromium carbonyl complexes of polyamides containing units derived from aromatic diamines, in which 10 to 90% of those units are complexed with a chromium carbonyl compound, and a process for making the partially complexed polyamides.

Polyamides containing units derived from aromatic diamines are known. Aramids are a type of polyamide in which the polymer consists essentially of monomeric units derived from aromatic diamines and aromatic diacids. Some aramids, such as those derived from p-phenylenediamine and terephthalic acid [herein sometimes PPD/T or poly(p-phenyleneterephthalamide)], are not generally soluble in organic solvents, making it difficult to fabricate useful items from them. It has been found that partially complexing the aromatic diamine used in these polymers with a chromium carbonyl compound (and hence the aromatic diamine units in the polymer are also partially complexed) renders the polymers relatively more soluble in organic solvents.

J. Jin and R. Kim, Polym. J., vol. 19, p. 977-980 (1987) report the preparation of polyamides in which the aromatic diamine derived units are completely complexed with $Cr(CO)_3$. No mention is made of partially complexed polymers, and the resulting solutions are not reported to be lyotropic.

SUMMARY OF THE INVENTION

This invention concerns a partially complexed polyamide containing units derived from an aromatic diamine, wherein 10% to 90% of said units are complexed with a group of the formula $Cr(CO)_2L$, wherein L is CO or a ligand which is capable of displacing CO from a $Cr(CO)_3$ complex of an aromatic diamine, and is capable of forming the stable complex aromatic diamine·$Cr(CO)_2L$.

This invention also includes a process for making a partially complexed polyamide derived from an aromatic diamine, wherein 10% to 90% of said units are complexed with a group of the formula $Cr(CO)_2L$, comprising, a) reacting in solution an aromatic diamine·$Cr(CO)_2L$ complex with an aromatic diacyl halide, wherein the molar ratio of said complex to said diacyl halide is 1:10 to 9:10;

b) then adding and reacting an aromatic diamine, provided that the amount of said aromatic diamine added is such that the molar ratio of said complex plus said aromatic diamine to said aromatic diacyl halide is 1:1; and wherein L is CO or a ligand which is capable of displacing CO from a $Cr(CO)_3$ complex of an aromatic diamine, and is capable of forming the stable complex aromatic diamine·$Cr(CO)_2L$.

This invention further concerns a process for making an anisotropic film, comprising, subjecting a solution in a solvent of an aramid, which aramid is fully or partially complexed with a group of the formula $Cr(CO)_2L$, to shear while forming a thin layer of said solution, and then removing said aramid from solution; and wherein L is CO or a ligand which is capable of displacing CO from a $Cr(CO)_3$ complex of an aromatic diamine, and is capable of forming the stable complex aromatic diamine·$Cr(CO)_2L$.

This invention also concerns a process for making a fully or partially complexed aramid fiber, comprising, gel spinning a lyotropic solution of an aramid, provided that said aramid is complexed with a group of the formula $Cr(CO)_2L$, wherein L is CO or a ligand which is capable of displacing CO from a $Cr(CO)_3$ complex of an aromatic diamine, and is capable of forming the stable complex aromatic diamine·$Cr(CO)_2L$.

DETAILS OF THE INVENTION

The polymers that are useful herein are, in general, polyamides. Polyamides are polymers wherein the monomeric units are joined by an amide linkage, —CO—NH—. In order to form the chromium complex, the monomer unit derived from the diamine must be an aromatic diamine. An aromatic diamine is a diamine in which each of two —$NH_2$ groups are directly bound to a carbon atom which is part of an aromatic ring. Preferred aromatic diamines (and the polymeric units derived from them) are phenylenediamines, napthalenediamines, biphenylyldiamines and oxydianilines. By p-phenylenediamines, for example, are meant the various positional isomers (ortho, meta and para), as well as phenylenediamines that contain substituents on the aromatic ring. More preferred diamines are m-phenylenediamine and p-phenylenediamine and especially preferred is p-phenylenediamine. It is preferred if the aromatic diamine (total of the complexed and uncomplexed aromatic diamine) is at least 10 mole percent of the total diamine used to prepare the polyamide, more preferred if it is at least 50%, and especially preferred if it is at least 90% of the total diamine.

The other monomer type used in polyamides is a diacid or a reactive derivative of a diacid. It is preferred if the diacid is an aromatic diacid. By aromatic diacid is meant a diacid wherein each of the carboxyl groups is directly bound to a carbon atom of an aromatic ring. By an aromatic diacyl halide is meant a compound wherein each of two acyl halide groups (—COX, wherein X is chlorine or bromine) is directly bound to a carbon atom of an aromatic ring. Preferred aromatic diacids (and their corresponding diacyl halides) are terephthalic acids, isophthalic acids, bibenzoic acids, naphthalene dicarboxylic acids, and oxydibenzoic acids. More preferred aromatic diacids (and their diacyl halides) are terephthalic and isophthalic acids, and terephthalic acid is especially preferred.

Preferred polyamides are aramids, especially those composed of units made from combinations of the above mentioned preferred aromatic diamines and aromatic diacids. More preferred aramids are PPD/T and m-phenyleneisophthalamide. Especially preferred is PPD/T.

The chromium groups that are complexed with the aromatic diamine or polyamide have the formula $Cr(CO)_2L$, wherein L is CO or a ligand which is capable of displacing CO from the $Cr(CO)_3$ complex of the aromatic diamine, and is capable for forming the stable complex aromatic diamine·$Cr(CO)_2L$. Such compounds, and their preparation, are known, see, for example, R. P. A. Sneedon, Organochromium Compounds, Academic Press, New York, 1975. Suitable groups for L include, but are not limited to, $PR^1_3$, $P(OR^1)_3$, $R^2_2CN$, pyridine, $N_2$, and $CS_2$, dimethylsulfoxide, $R^3C\equiv CR^3$, and $\eta^2$-alkene, wherein each $R^1$ is independently hydrocarbyl, $R^2$ is alkyl, and each $R^3$ is independently hydrogen, alkyl or aryl. It is believed that as each $R^1$, $R^2$ or $R^3$ gets larger and larger (more bulky), the tendency is for lyotropic polymer solutions to become isotropic, so it is preferred if each $R^1$, $R^2$, and $R^3$ contains 6 or fewer carbon atoms, more preferred if each $R^1$, $R^2$, and $R^3$ contain 4 or less carbon atoms. It is preferred if L is CO, $PR^1{}_3$, or $P(OR^1)_3$, and more preferred if L is CO.

The proportion of groups derived from aromatic diamines that are complexed in the polyamide is 10% to 90%, preferably 25% to 75%. At the lower end of this range, 10%, some polyamides may not be soluble. For example, it is believed that the solubility limit for high molecular weight PPD/T in N,N-dimethylacetamide at room temperature is just below about 25% complexation of the PPD units.

The (fully or partially) complexed polyamides, especially their solutions, are sensitive to water and oxygen, and so should be handled in an inert atmosphere, such as nitrogen or argon. The complex can be decomposed, and the parent polyamide formed, by heating the complexed polymer in an inert atmosphere, in air, or by treatment with an oxidizing agent, for example solution of Ce(IV) or iodine (see Examples 7 and 9). The latter extracts most of the chromium from the polymer.

The partially complexed polyamides of the present invention can be formed into fibers and films, particularly from solutions of the partially complexed polyamides. For example, films may be formed by spreading a thin layer of the polyamide solution and then either allowing the solvent to evaporate or coagulating the polymer with a nonsolvent and then removing the solvent and nonsolvent. Fibers can be formed by gel spinning, a well known technique. For forming either films or fibers, it is preferred if partially complexed aramids are used, and more preferred if the solution of the complex is lyotropic. PPD/T is an especially preferred aramid for forming films and fibers. The films are useful in electronic parts and the fibers are useful in ropes and fibers.

Partially complexed aramids are made by sequentially reacting the required amount of complexed aromatic diamine with the total amount of diacyl halide to be used in making the polymer, and after that reaction is essentially complete adding the uncomplexed aromatic diamine, and completing the polymerization. This sequential reaction is necessary to avoid block polymer formation and/or precipitation of uncomplexed polymer, since it is believed that the complexed aromatic diamine is considerably less reactive than the uncomplexed aromatic diamine. The polymerization process is otherwise carried out in the well known way of making aramids from aromatic diacyl halides and aromatic diamines. Typical process temperatures are about $-20°$ C. to about 100° C., preferably about $-10°$ C. to about 25° C. Highly polar, but non-protic solvents, are preferred for the polymerization. N-alkylated amide solvents such as N,N-dimethylacetamide and N-methylpyrrolidone are particularly suitable. Other useful solvents include N,N,N',N'-tetramethylurea, hexamethylphosphoramide, N-methylpiperidone, N,N-dimethylpropionamide. N,N-Dimethylacetamide is especially preferred. Inorganic salts, such as LiCl or $CaCl_2$, may also be dissolved in the solvent to increase polymer solubility. It is preferred if the solvents, and indeed the whole process, be water and oxygen free, to avoid side reactions and decomposition of the starting materials and/or products. It is thus convenient to carry out the reaction under an inert gas such as nitrogen or argon. In order to keep the ingredients well mixed, it is preferred to keep the liquid under fairly vigorous agitation while the polymer is being formed. Preferred ingredients are as listed above for the polymers, as appropriate for making aramids.

Anisotropic films can be formed from fully or partially complexed aramids by forming a thin layer of the solution and then removing the aramid from the solution. This can be done for example, either by evaporation of the solvent (rapid evaporation is preferred to maintain the anisotropy), or by first coagulating the polymer with a nonsolvent and then removing both the solvent and nonsolvent. Coagulating the polymer is a preferred method. In order to form an anisotropic film, the complexed aramids must form a lyotropic solution. A preferred complexed aramid is PPD/T. Preferred solvents are listed above. It is necessary to apply shear to the solution while forming the thin film of the solution.

By an anisotropic film is meant one that has different properties in different directions. This is usually considered to be indicative of liquid crystallinity in the film (or fiber, see below). For example, higher physical properties such as tensile modulus and tensile strength are usually obtained in the shear direction, when compared to those perpendicular to the shear direction. It has surprisingly been found that when partially complexed aramids are used, more highly anisotropic properties are obtained, than when fully complexed aramids are used (compare Examples 10 and 11).

Similarly, exceptionally strong fibers can be formed from lyotropic solutions of the fully or partially complexed aramids by gel spinning. Gel spinning (sometimes also called wet spinning) is well known in the art, see for example H. F. Mark, et al., Ed., Encyclopedia of Polymer Science and Engineering, Vol. 6, John Wiley and Sons, New York, 1985, p. 815-819. A preferred complexed aramid is PPD/T, and solvents for the process are as listed above.

The following abbreviations are used in the examples:

| | |
|---|---|
| PPD | p-phenylenediamine |
| PPD-Cr(CO)$_3$ | (p-phenylenediamine)chromium tricarbonyl |
| PPD-Cr(CO)$_2$PBu$_3$ | (p-phenylenediamine)chromium dicarbonyl tributylphosphine |
| TCl | terephthaloyl chloride |
| DMAc | N,N-dimethylacetamide |
| PPD-T | poly(p-phenyleneterephthalamide) |
| MPD | m-phenylenediamine |
| ICl | isophthaloyl chloride |
| MPD-I | poly(m-phenyleneisophthalamide) |

EXAMPLE 1

PPD-T Copolymer: 50% PPD-Cr(CO)3/50% PPD

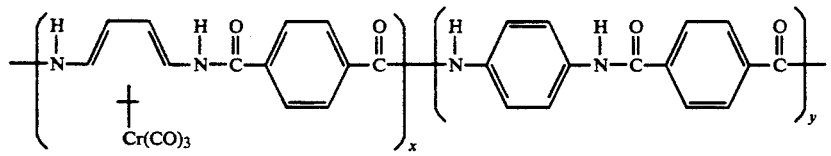

x = 50%, y = 50%

In a nitrogen flush glove box, PPD-Cr(CO)3 (0.300 g, 1.23 mmol, 0.50 eq.) and TCl (0.499 g, 2.46 mmol, 1.00 eq.) were charged into an oven dried 150 mL polymerization flask equipped with a mechanical stirrer. PPD (0.133 g, 1.23 mmol, 0.50 eq) was weighed into a vial. Anhydrous DMAc (12.65 g) was weighed into a vial, and this was the total quantity of solvent used for the polymerization (6.86% solids). PPD was dissolved in ca. 6 g of DMAc at room temperature.

The reaction flask, charged with PPD-Cr(CO)3 and TCl, and the remaining DMAc solvent were cooled to $-10°$ C. (dry/ice/acetone) for 10 min. The DMAc was added to the reaction flask to start the polymerization, and the temperature was maintained at $-10°$ C. for 5 min. The cooling bath was removed, and the reaction was allowed to proceed at room temperature for 5 min. The cooling bath was then replaced, and the comonomer PPD in DMAc solution was added. The reaction was maintained at $-10°$ C. for 5 min, and was then allowed to warm to room temperature. The orange-colored, homogeneous solution became highly viscous and opalescent (indicating a lyotropic solution) within 10 to 30 min.

Films of the copolymer were prepared by transferring the polymer solution to a glass plate and spreading the solution with use of a doctor blade (15 mil). Anisotropy was introduced into the polymer films by drawing the lyotropic solutions with the doctor blade. Coagulation the polymer films was achieved by immersion of the glass plate into an anhydrous methanol bath. The yellow-orange films were then dried between glass plates in a vacuum oven at 80°-90° C. for at least 24 h.

Characterization

Inherent viscosity (H2SO4, 30° C., 0.5%)=1.73 dL/g.

IR (film): $\nu$CO 1964, 1889 cm$^{-1}$.

Anal. Calcd: C, 60.79; H, 3.29; N, 9.15; Cr, 8.49. Found: C, 60.91; H, 4.25; N, 8.46; Cr, 6.46.

TGA (N2, 10° C./min): CO loss ca. 250° C. (7%), loss at 500° C.

Tensile Properties (machine direction): modulus: 1877 kpsi; strength: 47.1 kpsi, % elongation: 1.8.

Tensile Properties (transverse direction): modulus: 629.5 kpsi; strength 14.3 kpsi, % elongation: 2.1.

Polymer solution is lyotropic (optical microscopy).

EXAMPLE 2

PPD-T Copolymer: 75% PPD-Cr(CO)3/25% PPD

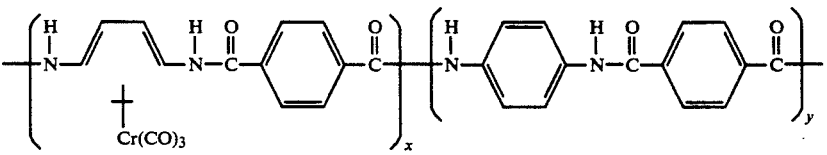

x = 75%, y = 25%

In a nitrogen flush glove box, PPD-Cr(CO)3 (0.450 g, 1.85 mmol, 0.75 eq.) and TCl (0.499 g, 2.46 mmol, 1.00 eq.) were charged into an oven dried 150 mL polymerization flask equipped with a mechanical stirrer. PPD (0.067 g, 6.15 mmol, 0.25 eq) was weighed into a vial. Anhydrous DMAc (12.65 g) was weighed into a vial, and this was the total quantity of solvent used for the polymerization (7.43% solids). PPD was dissolved in ca. 3 g of DMAc at room temperature.

The polymerization reaction and film preparation were carried out as described in Example 1.

Characterization

Inherent viscosity (DMAc, 25° C., 0.1%)=3.94 dL/g.

Inherent viscosity (H2SO4, 30° C., 0.5%)=1.87 dL/g.

IR (film): $\nu$CO 1964, 1889 cm$^{-1}$.

Anal. Calcd: C, 57.36; H, 2.96; N, 8.23; Cr, 11.96. Found: C, 57.49; H, 3.85; N, 7.71; Cr, 9.91.

TGA (N2, 10° C./min): CO loss ca. 250° C. (16%), loss at 500° C.

Tensile Properties (machine direction): modulus: 1161 kpsi; strength: 33.8 kpsi, % elongation: 2.3.

Polymer solution is lyotropic (optical microscopy).

EXAMPLE 3

PPD-T Copolymer: 25% PPD-Cr(CO)3/75% PPD

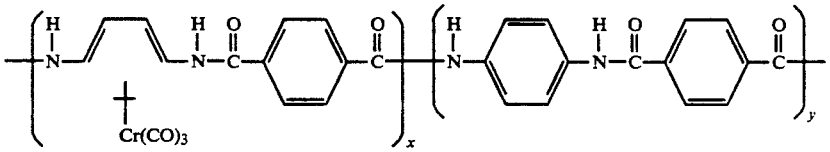

x = 25%, y = 75%

In a nitrogen flush glove box, PPD-Cr(CO)₃ (0.150 g, 6.15 mmol, 0.25 eq.) and TCl (0.499 g, 2.46 mmol, 1.00 eq.) were charged into an oven dried 150 mL polymerization flask equipped with a mechanical stirrer. PPD (0.200 g, 1.85 mmol, 0.75 eq) was weighed into a vial.

Anhydrous DMAc (12.65 g) was weighed into a vial, and this was the total quantity of solvent used for the polymerization (6.29% solids). PPD was dissolved in ca. 10 g of DMAc at ca. 50° C.

The polymerization reaction and film preparation were carried out as described in Example 1.

Characterization

Inherent viscosity ($H_2SO_4$, 30° C., 0.5%) = 1.84 dL/g.

IR (film): $\nu CO$ 1962, 1886 $cm^{-1}$.

Anal. Calcd: C, 65.07; H, 3.70; N, 10.29; Cr, 4.77. Found: C, 63.26; H, 4.54; N, 8.88; Cr, 3.34.

TGA ($N_2$, 10° C./min): CO loss ca. 250° C. (21%), loss at 500° C.

Tensile Properties (machine direction): modulus: 979 kpsi; strength: 34.1 kpsi, % elongation: 8.6.

Polymer solution is lyotropic (optical microscopy).

EXAMPLE 4

PPD-T Copolymer: 50% PPD-Cr(CO)₂PBu₃/50% PPD

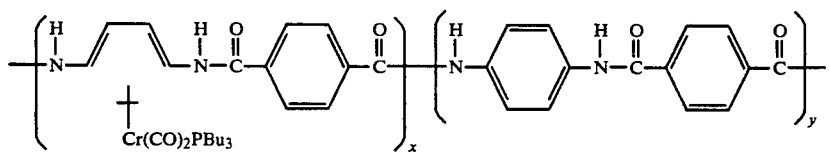

x = 50%, y = 50%

In a nitrogen flush glove box, PPD-Cr(CO)₂PBu₃ (0.314 g, 0.75 mmol, 0.50 eq.) and TCl (0.305 g, 1.50 mmol, 1.00 eq.) were charged into an oven dried 150 mL polymerization flask equipped with a mechanical stirrer. PPD (0.081 g, 0.75 mmol, 0.50 eq.) was weighed into a vial. Anhydrous DMAc (7.72 g) was weighed into a vial, and this was the total quantity of solvent used for the polymerization (8.31% solids). PPD was dissolved in ca. 4 g of DMAc at room temperature.

The polymerization reaction and film preparation were carried out as described in Example 1.

Characterization

IR (film): $\nu CO$ 1873, 1819 $cm^{-1}$.

Polymer solution is not birefrigent (optical microscopy).

EXPERIMENT 1

PPD-T Copolymer: 50% PPD-Cr(CO)3/50% PPD Polymer prepared by Simultaneous Monomer Addition

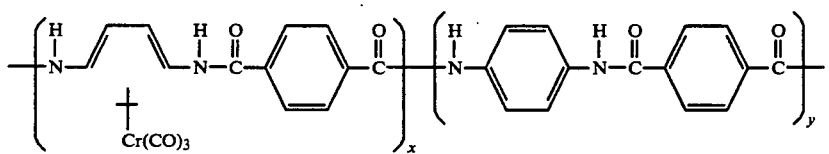

x = 50%, y = 50%

In a nitrogen flush glove box, PPD-Cr(CO)₃ (0.150 g, 0.615 mmol, 0.50 eq.), PPD (0.067 g, 0.615 mmol, 0.50 eq.) and TCl (0.250 g, 1.23 mmol, 1.00 eq.) were charged into an oven dried 150 mL polymerization flask equipped with a mechanical stirrer. Anhydrous DMAc (6.33 g) was weighed into a vial, and this was the total quantity of solvent used for the polymerization (6.86% solids).

The reaction flask, charged with PPD-Cr(CO)₃, PPD, and TCl, and the DMAc solvent were cooled to −10° C. (dry ice/acetone) for 10 min. The DMAc was added to the reaction flask to start the polymerization. After solvent addition, both dissolution of the monomers and precipitation of solids occurred. (The solids that precipitated are most likely to be PPD-T oligomers formed by reaction of uncomplexed PPD (the more reactive diamine monomer) and TCl. Note: this precipitation behavior is also observed in the control polymerization between PPD and TCl under the same conditions) The reaction temperature was maintained at −10° C. for 5 min. The cooling bath was removed, and the reaction was allowed to proceed at room temperature. The orange-colored heterogeneous solution became highly viscous. No films were prepared due to the heterogeneous nature of the polymer solution.

The preparation of PPD-T copolymers by the simultaneous addition of the diamine monomers does not allow control over the incorporation of the monomers and is not amenable to film formation.

EXAMPLE 6

Thermal Decomposition of Complexed Polymer

A 100% Cr(CO)₃ PPD-T film (ca. 5 in×5 in) made by a method similar to that described in Example 1, clamped in a metal frame was heated in air at 250° C. for 2 h. The film turned dark green/brown. Analysis indicated complete loss of CO ligands.

IR (film): complete loss of CO (from $Cr(CO)_3$ complex).

TGA ($N_2$, 10° C./min): No significant weight loss below 400° C. (complexed film shows CO loss at ca. 250° C.).

Inherent viscosity ($H_2SO_4$, 30° C., 0.5%) = 1.10 dL/g.

Anal. Calcd (for PPD-T -Cr): C, 57.94; H, 3.47; N, 9.65; Cr, 17.91. Found: C, 56.80; H, 3.69; N, 7.81; Cr, 15.10.

Tensile Properties (machine direction): modulus: 338 kpsi; strength: 1.8 kpsi, % elongation: 0.3.

EXAMPLE 7

Oxidative Decomposition of Complexed Polymer

A 100% $Cr(CO)_3$ PPD-T film (ca. 5 in × 5 in) made by a method similar to that described in Example 1, clamped in a metal frame was immersed in THF (ca. 500 mL) containing iodine (ca. 4 g) for 2 h at room temperature. The film was rinsed with THF (3 times), and dried in vacuo for 24 h. Analysis indicated loss of the $Cr(CO)_3$ complex.

IR (film): complete loss of CO (from $Cr(CO)_3$ complex).

Inherent viscosity ($H_2SO_4$, 30° C., 0.5%) = 2.33 dL/g.

Anal. Calcd (for PPD-T ): C, 70.58; H, 4.23; N, 11.76; Cr, 0. Found: C, 58.78; H, 4.42; N, 8.12; Cr, 2.43

Tensile Properties (machine direction): modulus: 1273 kpsi; strength: 27 kpsi, % elongation: 1.2

EXAMPLE 8

Thermal Decomposition of Complexed Polymer

A 50% $Cr(CO)_3$ PPD-T film (ca. 3 in × 3 in) made by a method similar to that described in Example 1, was heated in argon at 250° C. for 2 h. The film turned dark green/brown. Analysis indicated complete loss of CO ligands.

IR (film): complete loss of CO (from $Cr(CO)_3$ complex)

Anal. Calcd (for PPD-T −0.50 Cr): C, 60.79; H, 3.29; N, 9.15; Cr, 8.49. Found: C, 60.84; H, 4.50; N, 8.38; Cr, 6.40

Tensile Properties (machine direction): modulus: 989 kpsi; strength: 17 kpsi, % elongation: 2.1.

EXAMPLE 9

Oxidative Decomposition of Complexed Polymer

A 50% $Cr(CO)_3$ PPD-T film (ca. 3 in × 3 in.) made by a method similar to that described in Example 1, was immersed in THF (ca. 300 mL) containing iodine (ca. 2.9 g) for 1.5 h at room temperature. The film was rinsed with THF (3 times), and dried in vacuo for 24 h. Analysis indicated loss of the $Cr(CO)_3$ complex.

IR (film): complete loss of CO (from $Cr(CO)_3$ complex)

Anal. Calcd (for PPD-T ): C, 70.58; H, 4.23; N, 11.76; Cr, 0. Found: C, 60.51 H, 4.34; N, 8.96; Cr, 1.47

Tensile Properties (machine direction): modulus: 898 kpsi; strength: 26 kpsi, % elongation: 3.0

EXAMPLE 10

Properties of a Film

A film was made by the method described in Example 1 from a 100% $Cr(CO)_3$ PPD-T polymer.

Tensile Properties (machine direction): modulus: 8.8 GPa; strength: 0.21 GPa, % elongation: 3.2

Tensile Properties (transverse direction): modulus: 6.7 GPa; strength: 0.17 GPa, % elongation: 3.4

EXAMPLE 11

Properties of a Film

A film was made by the method described in Example 1 from a 50% $Cr(CO)_3$ PPD-T polymer.

Tensile Properties (machine direction): modulus: 6.9 GPa; strength: 0.15 GPa, % elongation: 3.3

Tensile Properties (transverse direction): modulus: 2.6 GPa; strength: 0.062 GPa, % elongation: 4.9

What is claimed is:

1. A partially complexed polyamide, comprising, polyamide containing units derived from an aromatic diamine, wherein 10% to 90% of said polyamide containing units are complexed with a group of the formula $Cr(CO)_2L$, wherein L is CO or a ligand which is capable of displacing CO from a $Cr(CO)_3$ complex of an aromatic diamine, and is capable of forming the stable complex aromatic diamine·$Cr(CO)_2L$.

2. The polyamide as recited in claim 1 wherein said polyamide is an aramid.

3. The polyamide as recited in claim 2 wherein said aramid is derived from phenylenediamines, naphthylenediamines, biphenylyldiamines or oxydianilines, and terephthalic acids, isophthalic acids, bibenzoic acids, naphthalenedicarboxylic acids or oxydibenzoic acids.

4. The polyamide as recited in claim 2 wherein said aramid is poly(p-phenyleneterephthalamide) or poly(m-phenyleneisophthalamide).

5. The polyamide as recited in claim 2 wherein L is CO, $PR^1_3$, or $P(OR^1)_3$, wherein each $R^1$ is independently hydrocarbyl.

6. The polyamide as recited in claim 1 in which 25% to 75% of said units are complexed.

7. The polyamide in claim 2 in which 25% to 75% of said units are complexed.

8. A process for making a partially complexed aramid derived from an aromatic diamine, wherein 10% to 90% of said units are complexed with a group of the formula $Cr(CO)_2L$, comprising,
   a) reacting in solution an aromatic diamine·$Cr(CO)_2L$ complex with an aromatic diacyl halide, wherein the molar ratio of said complex to said diacyl halide is 1:10 to 9:10;
   b) then adding and reacting an uncomplexed aromatic diamine, provided that the amount of said aromatic diamine added is such that the molar ratio of said complex plus said aromatic diamine to said aromatic diacyl halide is 1:1; and wherein L is CO or a ligand which is capable of displacing CO from a $Cr(CO)_3$ complex of an aromatic diamine, and is capable of forming the stable complex aromatic diamine·$Cr(CO)_2L$.

9. The process as recited in claim 8 wherein said aromatic diamine is a phenylenediamine, naphthylenediamine, biphenylyldiamine or oxydianiline, and said diacyl halide is derived from terephthalic acids, isophthalic acids, bibenzoic acids, naphthalenedicarboxylic acids or oxydibenzoic acids.

10. The process as recited in claim 8 wherein said aromatic diamine is p-phenylenediamine and said aromatic diacyl halide is derived from terephthalic acid, or said aromatic diamine is m-phenylenediamine and said aromatic diacyl halide is derived from isophthalic acid.

11. The process as recited in claim 10 wherein said aromatic diamine is p-phenylenediamine and said aromatic diacyl halide is derived from terephthalic acid.

12. The process as recited in claim 8 wherein L is CO, $PR^1_3$, or $P(OR^1)_3$, wherein each $R^1$ is independently hydrocarbyl.

13. A film or a fiber of the polyamide of claim 1.

14. A film or a fiber of the polyamide of claim 2.

* * * * *